United States Patent
Davis et al.

(10) Patent No.: US 10,400,840 B2
(45) Date of Patent: Sep. 3, 2019

(54) FLIGHT TEST STAND

(71) Applicant: Top Flight Technologies, Inc., Malden, MA (US)

(72) Inventors: Eli M. Davis, Cambridge, MA (US); Long N. Phan, Somerville, MA (US)

(73) Assignee: Top Flight Technologies, Inc., Malden, MA (US)

( * ) Notice: Subject to any disclaimer, the term of this patent is extended or adjusted under 35 U.S.C. 154(b) by 60 days.

(21) Appl. No.: 15/593,407

(22) Filed: May 12, 2017

(65) Prior Publication Data

US 2017/0328513 A1    Nov. 16, 2017

Related U.S. Application Data

(60) Provisional application No. 62/458,163, filed on Feb. 13, 2017, provisional application No. 62/335,938, filed on May 13, 2016.

(51) Int. Cl.
| | |
|---|---|
| *F16M 7/00* | (2006.01) |
| *F16F 7/00* | (2006.01) |
| *F16B 2/20* | (2006.01) |
| *B64F 5/60* | (2017.01) |
| *B64C 39/02* | (2006.01) |
| *F16F 3/00* | (2006.01) |

(52) U.S. Cl.
CPC .............. *F16F 7/00* (2013.01); *B64C 39/024* (2013.01); *B64F 5/60* (2017.01); *F16B 2/20* (2013.01); *F16F 3/00* (2013.01); *B64C 2201/027* (2013.01); *B64C 2201/108* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,353,199 | B1 * | 1/2013 | Ma .................... | A63H 27/12 108/136 |
| 8,573,536 | B2 * | 11/2013 | McGeer .............. | B64C 39/024 244/110 C |
| 9,228,917 | B1 * | 1/2016 | Ma ..................... | G01M 1/02 |
| 9,545,852 | B2 * | 1/2017 | Streett ............... | B64C 39/024 |
| 9,650,156 | B2 * | 5/2017 | McChesney ........ | B64F 1/02 |
| 9,718,564 | B1 * | 8/2017 | Beckman ........... | G06Q 10/0832 |
| 9,764,837 | B2 * | 9/2017 | Phan .................. | B64D 27/02 |
| 9,845,165 | B2 * | 12/2017 | Michalski ........... | B64F 1/36 |
| 9,928,749 | B2 * | 3/2018 | Gil .................... | B64D 1/00 |
| 10,077,095 | B1 * | 9/2018 | McChesney ........ | B63B 27/36 |
| 2013/0082137 | A1 * | 4/2013 | Gundlach ........... | B64C 25/68 244/110 C |
| 2013/0161447 | A1 * | 6/2013 | McGeer .............. | B64C 39/024 244/110 F |

(Continued)

*Primary Examiner* — Freddie Kirkland, III
(74) *Attorney, Agent, or Firm* — Fish & Richardson P.C.

(57) ABSTRACT

A test stand for an unmanned aerial vehicle comprising: a base arranged to make contact with the ground; a frame extending from the base, the frame comprising at least a first side portion and a second side portion that define a space therebetween; and a mount slidably attached to the frame within the space, the mount configured to affix to an unmanned aerial vehicle such that the mount and the unmanned aerial vehicle slide within the defined space in a direction parallel to the frame during a test flight.

17 Claims, 6 Drawing Sheets

(56) References Cited

U.S. PATENT DOCUMENTS

2015/0239578 A1\* 8/2015 McGeer .................... B64F 1/02
 244/110 R
2016/0137304 A1 5/2016 Phan et al.
2016/0376031 A1\* 12/2016 Michalski ................. B64F 1/36
 701/15

\* cited by examiner

Fig. 6

FLIGHT TEST STAND

CLAIM OF PRIORITY

This application claims priority to U.S. Patent Application Ser. No. 62/458,163, filed on Feb. 13, 2017, and to U.S. Patent Application Ser. No. 62/335,938, filed on May 13, 2016, the contents of both of which are incorporated here by reference in their entirety.

TECHNICAL FIELD

This invention relates to a test stand for an unmanned aerial vehicle.

BACKGROUND

During operation of an unmanned aerial vehicle (UAV), a source that provides power to the motors may eventually become depleted. When the power source is depleted, the UAV will cease operating. If the UAV is in flight, this can result in a catastrophic crashing of the UAV.

SUMMARY

In one aspect, a test stand for an unmanned aerial vehicle includes a base arranged to make contact with the ground. The test stand also includes a frame extending from the base. The frame includes at least a first side portion and a second side portion that define a space therebetween. The test stand also includes one or more mounting mechanism slidably attached to the frame. The one or more mounting mechanism is configured to affix to an unmanned aerial vehicle such that the unmanned aerial vehicle is permitted to slide within the defined space in a direction parallel to the frame during a test flight.

Implementations can include one or more of the following features.

In some implementations, the test stand also includes one or more cross beams that are affixed to a top end of the first side portion and a top end of the second side portion.

In some implementations, the base includes a plurality of legs.

In some implementations, the plurality of legs reside parallel to the ground.

In some implementations, the plurality of legs form angles with the ground such that bottom ends of the plurality of legs make contact with the ground and top ends of the plurality of legs are affixed to the frame.

In some implementations, each of the one or more mounting mechanism includes a wheel that is configured to reside in a respective track formed in the frame, and a fastener that is configured to affix the wheel to a corresponding clearance hole in the unmanned aerial vehicle.

In some implementations, the one or more mounting mechanism includes a mount.

In some implementations, the mount includes at least a first aperture within which the first side portion of the frame resides and a second aperture within which the second side portion of the frame resides.

In some implementations, the mount includes clips that are configured to attach to receiving mechanisms on the unmanned aerial vehicle.

In some implementations, the mount includes a docking device that is configured to releasably attach to the unmanned aerial vehicle.

In some implementations, one or both of the mount and the unmanned aerial vehicle includes one or more feet configured to dampen a collision with the ground.

In some implementations, the feet include one or more springs.

In some implementations, the feet include a force-absorbing material.

In some implementations, the feet include tennis balls.

In some implementations, the first side portion includes two beams that extend from the base and the second side portion includes two beams that extend from the base.

In some implementations, the frame includes one or more additional side portions that further define the space.

In some implementations, the test stand is configured to attach to other test stands to form a test stand system for testing flights of a plurality of unmanned aerial vehicles.

In another aspect, a test stand system for a plurality of unmanned aerial vehicles includes a plurality of test stands. Each of the test stands includes a base arranged to make contact with the ground. Each of the test stands also includes a frame extending from the base. The frame includes at least a first side portion and a second side portion that define a space therebetween. Each of the test stands also includes one or more mounting mechanism slidably attached to the frame. The one or more mounting mechanism is configured to affix to an unmanned aerial vehicle such that the unmanned aerial vehicle is permitted to slide in a direction parallel to the frame during a test flight. Each base includes one or more mechanisms for fixing the bases of the plurality of test stands together.

Implementations can include one or more of the following features.

In some implementations, each test stand also includes a cross beam that is affixed to a top end of the first side portion and a top end of the second side portion.

In some implementations, the test stand system also includes a plurality of joists that each connects the cross beam of one of the test stands to the cross beam of another one of the test stands.

The details of one or more embodiments of the subject matter described herein are set forth in the accompanying drawings and the description below. Other features, objects, and advantages of the subject matter will be apparent from the description and drawings, and from the claims.

DETAILED DESCRIPTION

Some multi-rotor UAVs may rely (e.g., rely solely) on one or more batteries (e.g., rechargeable batteries) to provide power to drive rotor motors coupled to the propellers to achieve flight. A typical conventional multi-rotor UAV may include a lithium polymer (LiPo) battery which may provide about 150 to 210 Wh/kg of power. This may provide a typical loaded flight time of about 15 minutes and an unloaded flight time of about 32 to 45 minutes. In some implementations, advanced lithium sulfur batteries may also be used, which may provide about 400 Wh/kg of power. In such cases, flight times of about 30 minutes in a loaded configuration may be achieved.

In some implementations, a UAV may be powered by a micro hybrid generator system to extend the endurance and payload capabilities in UAV applications. Examples of such micro hybrid generator systems are described in U.S. application Ser. No. 14/942,600, filed Nov. 16, 2015, the contents of which are incorporated here by reference in their entirety. The micro hybrid generator system can include two separate power systems. A first power system can be a small and efficient gasoline powered engine coupled to a generator motor. In some examples, the first power system can serve as a primary source of power of the micro hybrid generator system. A second power system can be a high energy density rechargeable battery. Together, the first power system and the second power system can combine to form a high energy continuous power source that provides high peak power availability for the UAV. Further, either the first power system or the second power system can serve as a back-up power source if the other power source were to fail or become depleted.

Irrespective of the type of power source employed by the UAV, the power source may eventually become depleted during flight. When this occurs, the UAV will cease operating. If the UAV is in flight, this can result in a catastrophic crashing of the UAV. For example, if the UAV is being flight-tested outdoors at a typical flight altitude (e.g., in the order of tens, hundreds, or even thousands of meters), loss of power will likely result in severe damage to the UAV. Damage may result from the UAV making contact with the ground at a relatively high velocity (e.g., a velocity in excess of that which the UAV is designed to sustain during landing). Damage may result from one or more portions of the UAV making contact with the ground which are not designed to make such contact (e.g., such as propellers, arms, etc. of the UAV). For example, the UAV may rotate or flip as it approaches the ground after losing power, and a propeller or arm of the UAV may make contact with the ground, thereby resulting in breaking or bending of the propeller or arm. Such damage may result even when the UAV loses power at relatively low altitudes (e.g., less than 5 meters).

Risk of damage to the UAV can make testing of the UAV quite risky and costly. For example, when testing the capacity or range of the one or more power sources of the UAV, a tester may be reluctant to push the range limits of the power source due to the possibility that the UAV will crash when the power source eventually becomes depleted.

Further, in some implementations, the power source employed by the UAV may allow the UAV to sustain four to six hours (or, e.g., even longer) of flight time. Such extended length of flight time can be difficult for a tester to manually perform and sustain. For example, maintaining focus over such periods of time may be difficult. Additionally, requiring the full attention of the tester over such time periods may be inefficient because it prevents the tester from completing other tasks (e.g., such as testing other drones) in a timely manner.

Described herein is a test stand that can be used during flight tests of one or more UAVs. The test stand is designed to accept a UAV (e.g., via a mounting mechanism). The test stand allows the UAV to fly in a restricted or semi-restricted manner. For example, the test stand may allow the UAV to ascend and descend within predefined altitude limits (e.g., as limited by the structural dimensions of the test stand). In some implementations, the test stand may be configured such that the UAV maintains a substantially level flight orientation during use in the test stand. In other words, the test stand may substantially prevent the UAV from adjusting any combination of its roll, yaw, and pitch during flight. In some implementations, the UAV may be mounted to the test stand in such a way that a configurable amount of flight freedom is provided to the UAV. For example, the UAV may be attached to the mounting mechanism (or, e.g., the mounting mechanism may be attached to the test stand) such that the UAV may adjust any combination of one or more of its roll, yaw, and pitch within configurable limits. In some implementations, the test stand may allow for safe indoor testing of the UAV due to the flight restrictions that it provides.

When the power source eventually becomes depleted during the test flight, the test stand ensures that the UAV falls to the ground in a controlled or semi-controlled manner. For example, due to the imposed altitude restrictions, the UAV is prevented from reaching a degree of velocity while falling that would cause excessive damage to the UAV. Similarly, due to the test stand forcing the UAV to maintain a substantially level flight orientation, the fragile or expensive components of the UAV are prevented from making contact with the ground and thus excessive damage to these components can be avoided.

Figure 1:
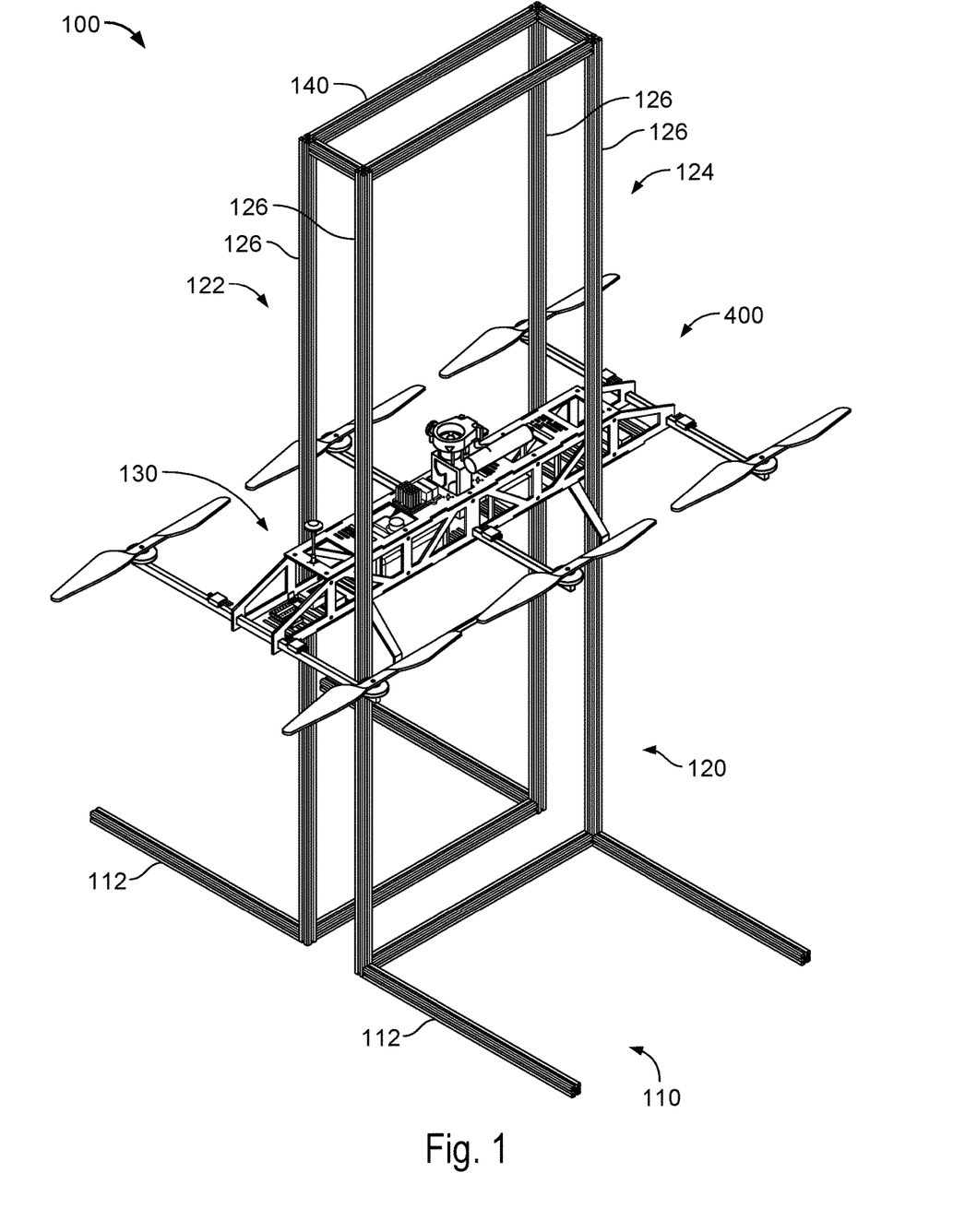
FIG. 1 shows an example of a test stand for use with a UAV.

FIG. 1 shows an example of a test stand 100 that is configured for use with a UAV 400. The test stand 100 includes a base 110, a frame 120 extending from the base, and a plurality of mounting mechanisms 130 that are attached to the frame 120.

The base 110 is arranged to make contact with the ground. In the illustrated arrangement, the base 110 includes a plurality of legs 112 that are arranged parallel to the ground. The legs 112 are arranged in a configuration that prevents the test stand 100 from tipping over (which could otherwise occur, e.g., due to the weight of the rest of the test stand 100 and the UAV 400). For example, the legs 112 may be arranged to cover an area of the ground having a sufficient size to prevent such tipping. In some implementations, the base 110 may comprise a material having a weight to prevent such tipping. For example, the weight of the base 110 may be greater than the weight of the remainder of the test stand 100. In some implementations, the base 110 may be configured to be affixed to the ground. For example, the legs 112 may include clearance holes to accept fasteners that affix the legs 112 to the ground.

In some implementations, the base 110 may be arranged such that the plurality of legs 112 do not reside parallel to the ground. For example, the legs 112 may have a tepee-shaped configuration in which the legs 112 form angles with the ground. Bottom ends of the legs 112 may make contact with the ground and top ends of the legs 112 may be affixed to the frame 120.

The frame 120 extends (e.g., vertically) from the base 110. The frame 120 may define an axis along which the UAV 400 is permitted to fly during testing. The frame 120 includes a first side portion 122 that extends from a first side of the base 110 and a second side portion 124 that extends from a second side of the base 110. The side portions 122, 124 define a space therebetween within which the UAV 400 may reside during flight. In the illustrated arrangement, each of the side portions 122, 124 includes two beams 126 along which the UAV 400 can fly during testing. While only two side portions 122, 124 are shown in the illustrated arrangement, additional side portions may be included. For example, a third side portion and a fourth side portion may extend from the base 110 such that the four side portions define a square space therebetween. In some implementations, each side portion may include only one beam. That is, the first side portion 122 may include a single beam 126 and the second side portion 124 may include a single beam 126.

In some implementations, such as in the illustrated arrangement, the test stand 100 may include one or more cross beams 140 that connect the side portions 122, 124 of the frame 120 together. The cross beams 140 may be affixed to a top end of the first side portion 122 and a top end of the second side portion 124. The cross beams 140 may be used to improve the structural integrity of the test stand 100. For example, the cross beams 140 may be configured to maintain the side portions 122, 124 of the frame 120 in a substantially vertical orientation. In some implementations, the cross beams 140 may be used as a fixation point for connecting multiple test stands 100 together, as described in more detail below.

In the illustrated arrangement, the test stand 100 includes a plurality of mounting mechanisms 130 that are configured to affix to (e.g., receive) the UAV 400. The mounting mechanisms 130 are attached (e.g., slidably attached) to the frame 120. The UAV 400 may be attached to the mounting mechanisms 130 in a manner that permits the mounting mechanisms 130 and the UAV 400 to slide along (e.g., in a direction parallel to) the frame 120 during a test flight.

Figure 2:
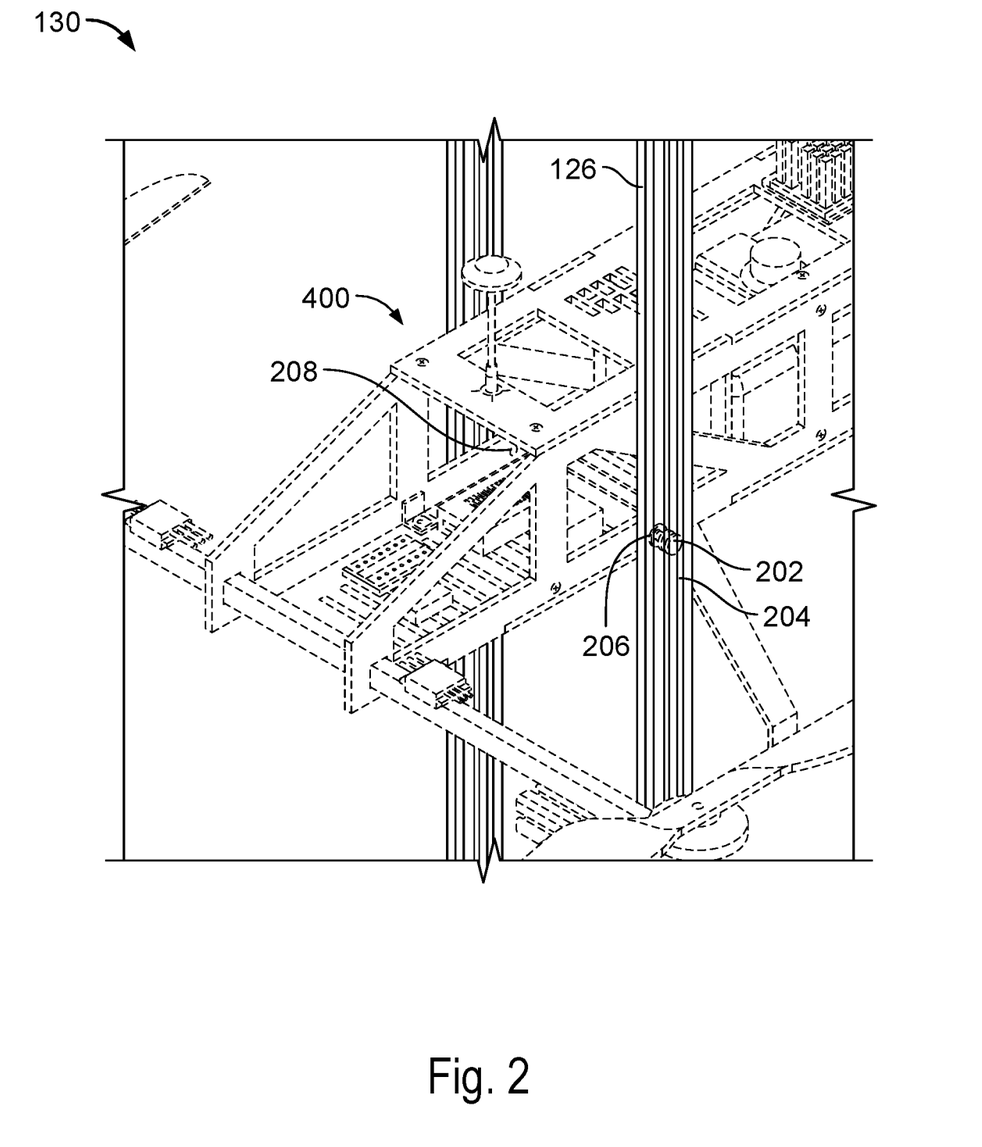
FIG. 2 shows an example of mounting mechanisms configured to affix to the UAV.

FIG. 2 shows an example of the mounting mechanisms 130. In the illustrated arrangement, the mounting mechanisms 130 are sliding components that are configured to slide vertically along the frame 120. Each sliding component includes a wheel 202 that is configured to fit in a track 204 (e.g., a T-slot) of one of the beams 126 of the frame 120. The sliding component also includes a fastener 206 that affixes the wheel 202 to a corresponding clearance hole 208 in the UAV 400. The wheel 202 is configured to rotate as it moves along the track 204, thereby reducing friction as the UAV 400 slides vertically along the frame 120. Reduction of friction between the UAV and the frame 120 allows the test flight to more closely mimic actual flight conditions.

Figure 3:
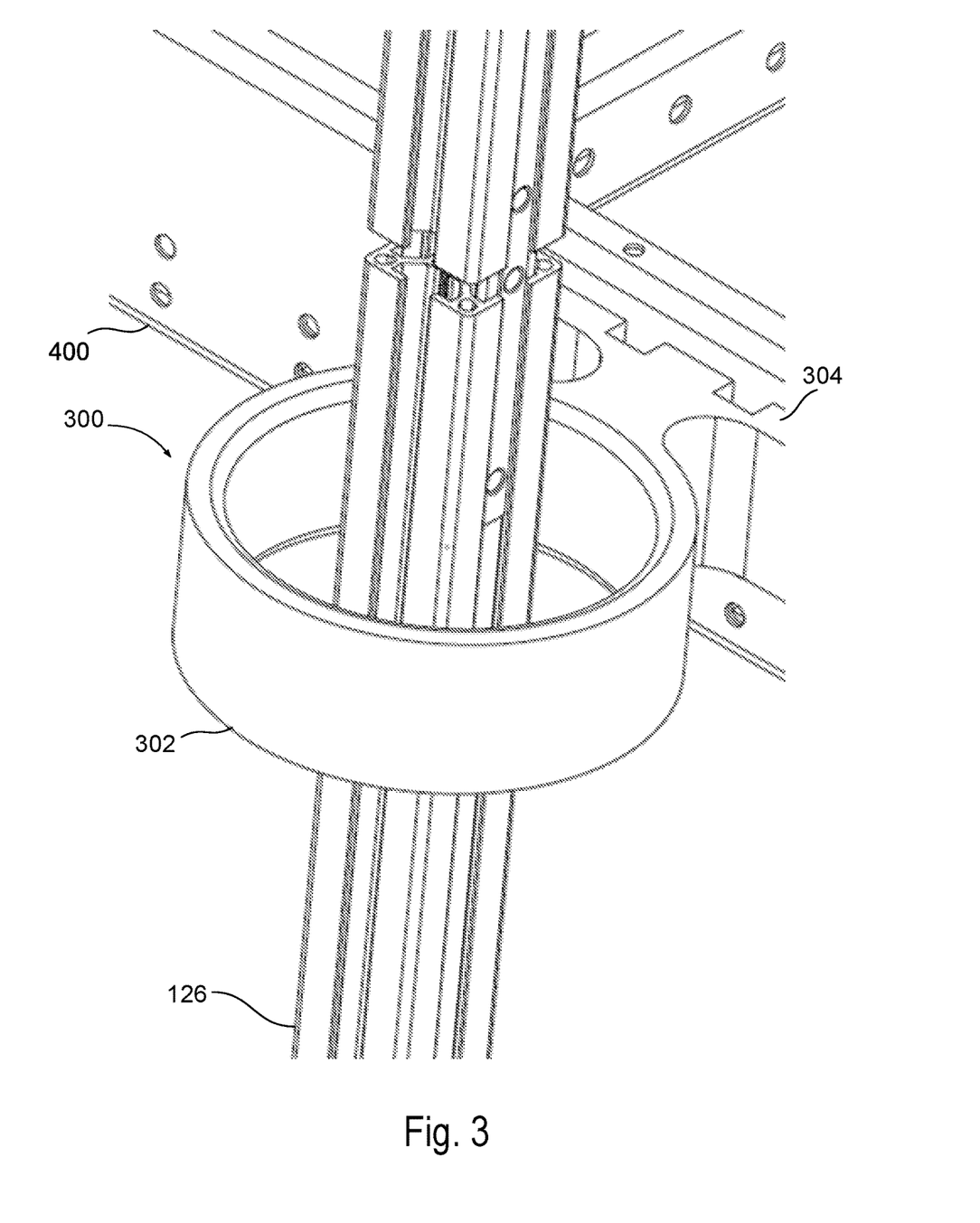
FIG. 3 shows another example of a mounting mechanism configured to affix to the UAV.

In some implementations, the UAV 400 may be connected to the test stand 100 by other types of mounting mechanisms. FIG. 3 shows another example of a mounting mechanism 300 that includes a ring portion 302 that forms an aperture and a connection portion 304. The connection portion 304 can include one or more clearance holes that are configured to accept fasteners that affix the connection portion 304 to the UAV 400. The ring portion 302 can be placed around a corresponding beam 126 of the frame 120 such that the mounting mechanism 300 and the UAV 400 are permitted to slide along (e.g., in a direction parallel to) the frame 120. A plurality of mounting mechanisms 300 may be provided (e.g., a mounting mechanism 300 may be provided for each beam 126 of the frame 120). In some implementation, the aperture formed by the ring portion 302 may include mechanisms for reducing friction between the mounting mechanism 300 and the beam 126, such as wheels, ball bearings, a friction-reducing treatment, etc.

In some implementations, the UAV 400 may be removably attached to the connection portion 304. For example, the UAV 400 and/or the connection portion 304 may include one or more clips that allow various different UAVs to be swapped in and out from the mounting mechanism 300 (e.g., without requiring disassembly and reassembly of the test stand). In this way, a plurality of different UAVs can be easily and quickly tested.

In some implementations, the particular configuration of the ring portion 302 may be chosen based on the desired characteristics of the test flight to be performed. For example, the aperture formed by the ring portion 302 may be designed to provide for some degree of flight freedom of motion (e.g., angular rotation) for any combination of roll, yaw, and pitch. For example, the aperture may have a circumference that is substantially greater than the perimeter of the beam 126 of the frame 120, thereby allowing the UAV 400 to adjust its roll, yaw, and pitch. In some implementations, the dimensions of the aperture may be configurable such that the degree of flight freedom can be adjusted based on the particular flight scenario. Providing a degree of flight freedom of motion can reduce the risk of the mounting mechanism 300 binding with the beam 126. Providing a degree of flight freedom of motion can also allow for a realistic flight testing scenario and can enable an operator (e.g., a tester of the UAV 400) to confirm stable flight characteristics of the UAV 400 prior to free-flight deployment of the UAV 400.

The test stand 100 can be made with any material suitable for providing the structural integrity suitable for the particular flight testing scenario. The material used may depend on the size, weight, etc. of the particular UAV to be tested. In some implementations, the test stand 100 may comprise a metal such as steel, carbon steel, stainless steel, iron, aluminum, copper, titanium, etc. In some implementations, the test stand 100 may comprise wood, polymer (e.g., plastic), etc. Other materials known to those skilled in the art can be utilized instead of, or in combination with, the aforementioned materials.

The test stand 100 may have a wide range of dimensions depending on the particular UAV to be tested. Large or heavy UAVs may be able to generate more force during flight due to their increased mass and potentially greater acceleration capabilities. Thus, the dimensions of the test stand 100 may be relatively large for testing such large or heavy UAVs in order to provide the size and weight for sufficiently restricting the flight of the UAV without allowing the test stand 100 to tip over. In contrast, smaller dimensions may be appropriate for relatively smaller UAVs that are not capable of generating excessive amounts of force during flight. In some implementations, the test stand 100 may have dimensions that are sufficient to accommodate relatively small UAVs that can be arranged in multiple configurations (e.g., a collapsed configuration or an open configuration), such as described in U.S. Provisional Application Ser. No. 62/394,861 (the "'861 application"), filed Sep. 15, 2016, the contents of which are incorporated here by reference in their entirety. In some implementations, the test stand 100 may have dimensions that are sufficient for, and otherwise be configured for testing the parachute mechanism described in the '861 application.

In some implementations, the base 110 of the test stand 100 may be designed to provide the weight or configuration necessary to keep the test stand 100 in an upright position during testing. For example, the base 110 may have a weight that is significantly heavier than the rest of the test stand 100 and the UAV 400 being tested. In some examples, the base 110 may have dimensions that cause the base 110 to cover a relatively large area of the ground. One or more dimensions of the base 110 may be proportional to the height of the test stand so that the torque caused by the UAV 400 at its highest possible elevation is insufficient to cause the test stand to tip over. For example, one or more of the length, width, diameter, etc. of the base 110 may be two times, three times, etc. greater than the height of the test stand 100. In some implementations, the test stand 100 may have particular minimum dimensions simply to accommodate UAVs of a particular size. For example, the dimensions of the test stand 100 may be such that the space formed between the first side portion 122 and the second side portion 124 of the frame 120 can accommodate the particular UAV 400.

In some implementations, the dimensions of the test stand 100 may depend at least in part on the particular flight testing scenario to be performed. For example, tests that call for the UAV 400 to maintain a relatively high flight altitude may be performed using a frame 120 having a length sufficient to allow the UAV 400 to slide along the frame 120 to reach such altitudes. Tests that allow the UAV 400 to have some additional degree of flight freedom (e.g., test that allow the UAV 400 to adjust any combination of its roll, yaw, and pitch, tests that allow the UAV 400 to move in a plane parallel to the ground, etc.) may call for the frame 120 to form a relatively larger space than would otherwise be formed to accommodate the UAV 400 during more restrictive flight tests.

Figure 4:
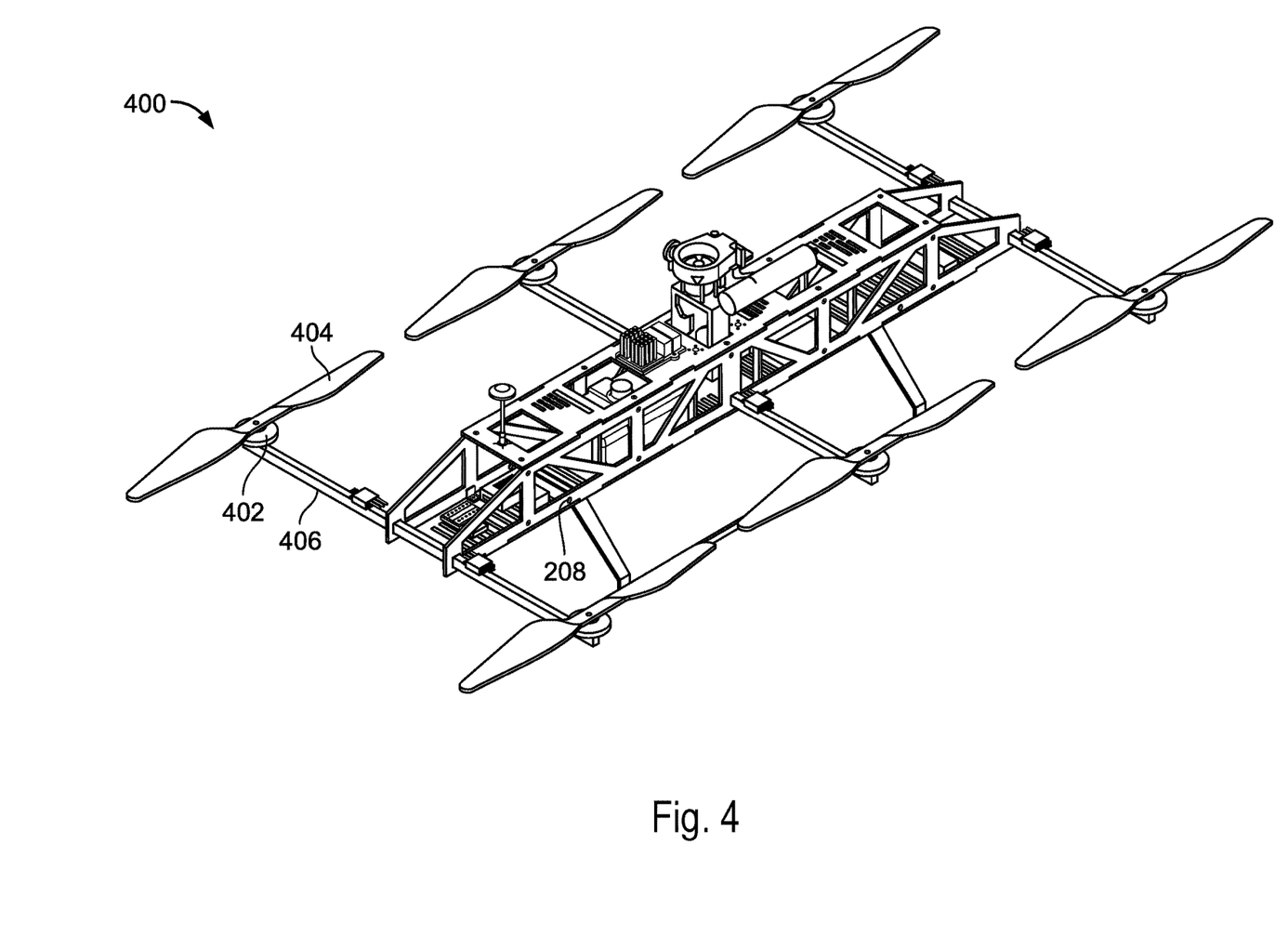
FIG. 4 shows a perspective view of the UAV.

FIG. 4 shows a perspective view of the UAV 400. The UAV 400 may be integrated with a micro hybrid generator system. The UAV 400 includes six rotor motors 402 each coupled to propellers 404. The rotor motors 402 and propellers 404 are positioned away from a main body of the UAV 400 by arms 406. The UAV 400 may include a Px4 flight Controller® (e.g., implemented as part of a 3 DR Pixhawk®). It should be understood that the test stand 100 can be used with UAVs that include more or fewer rotor motors 402, propellers 404, and arms 406, as understood by those skilled in the art.

Figure 5:
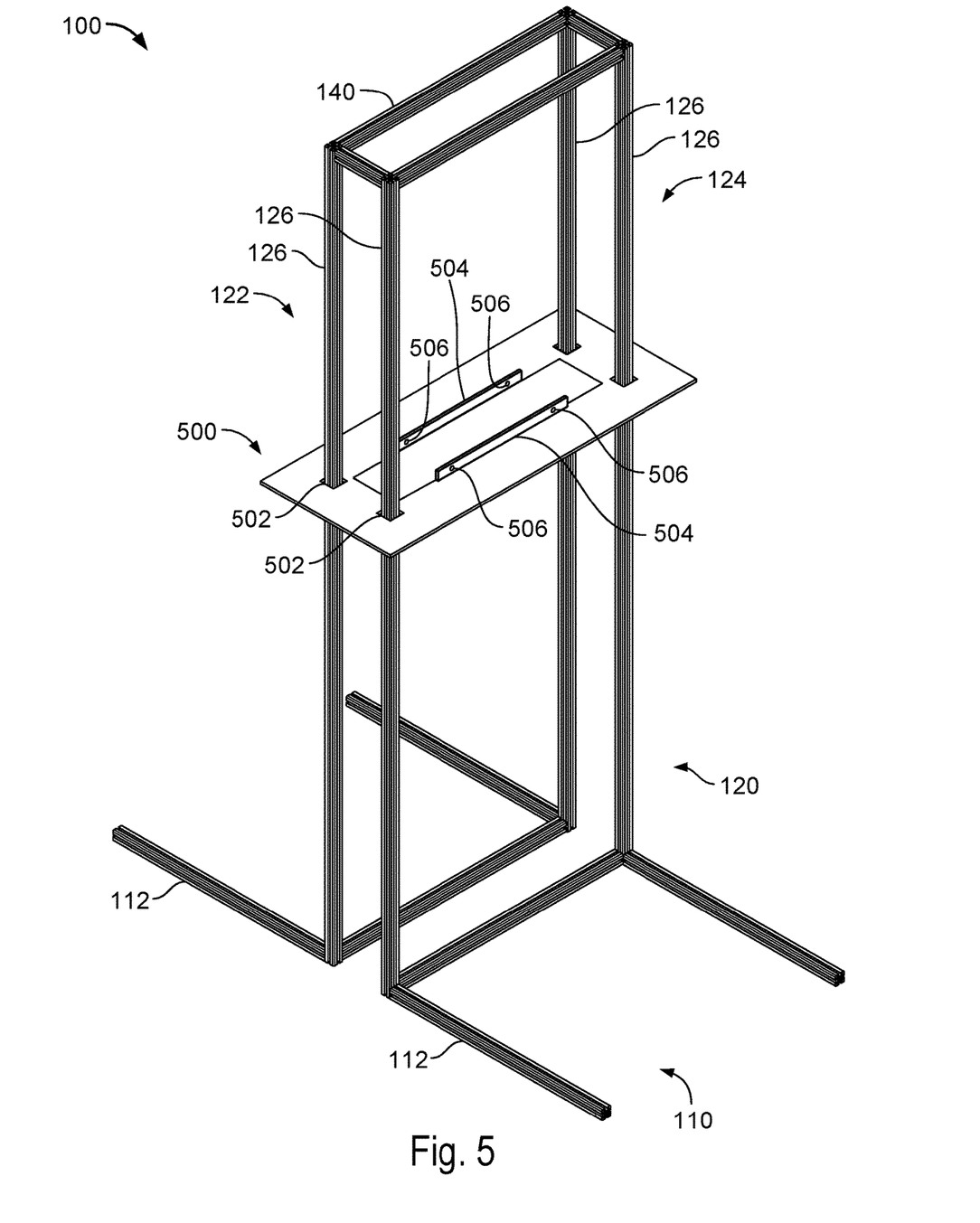
FIG. 5 shows another example of a test stand for use with the UAV.

In some implementations, rather than the UAV 400 being affixed (e.g., directly) to the frame 120 by a plurality of mounting mechanisms 130, the UAV 400 may be affixed to the frame 120 via a separate mounting device. FIG. 5 shows an example of the test stand 100 that includes a mount 500 that is attached (e.g., slidably attached) to the frame 120. In some implementations, the mount 500 itself can be considered a mounting mechanism. The mount 500 is attached to the frame 120 such that the mount 500 resides in the space defined by the side portions 122, 124.

The mount 500 is attached to the frame 120 in a manner that permits the mount 500 to slide along (e.g., in a direction parallel to) the frame 120. In the illustrated arrangement, the mount 500 includes a plurality of apertures 502 within which the side portions 122, 124 of the frame 120 reside. In some implementations, the apertures 502 may include mechanisms for reducing friction between the mount 500 and the frame 120, such as wheels, ball bearing, etc. In some implementations, the mount 500 may be attached to the frame 120 by sliding components, such as the sliding components described above with respect to FIG. 2.

The mount 500 is configured to affix to the UAV 400 in a manner that permits the mount 500 and the UAV 400 to slide along (e.g., in a direction parallel to) the frame 120 during a test flight. The mount 500 may include one or more mechanism for fixing the UAV 400 to the mount 500. In some examples, the UAV 400 may reside within a recess of the mount 500, and fasteners may be used to fix the UAV 400 in place. In the illustrated arrangement, the mount 500 includes two fins 504 with clearance holes 506 that are configured to accept fasteners that attach to the clearance holes 208 of the UAV 400. In some implementations, the mount 500 may include one or more clips that are configured to attach to the UAV 400 (e.g., attach to receiving mechanisms of the UAV 400).

In some implementations, the mount 500 may be permanently attached to the frame 120 and the UAV 400 may be removably attached to the mount 500. In this way, various different UAVs can be easily swapped out from the mount 500 without requiring disassembly and reassembly of the test stand 100. In some implementations, the mount 500 may include a docking device that is configured to receive the UAV 400. The UAV 400 (and, e.g., other UAVs to be tested) may include a component that mates with the docking device such that the UAV 400 is affixed to the mount 500. The docking device may include a release mechanism that permits the UAV 400 to be removed from the mount 500.

In some implementations, the mount 500 may include one or more feet configured to dampen a collision between the mount 500 and the ground. When the power source eventually becomes depleted during the test flight and the UAV 400 falls to the ground, the feet can help to minimize the impact force between the UAV 400 and the ground. In some implementations, the feet include one or more springs that accept the impact force in a controlled manner. In some implementations, the feet include (e.g., at their respective bottom ends) a force-absorbing or shock-absorbing material such as a polymer, rubber, neoprene, silicone, etc. In some implementations, the feet include a hollow spherical structure (e.g., ball), such as a tennis ball.

In some implementations, the force-absorbing or shock-absorbing capabilities of the feet are provided, at least in part, by the connection between the feet and the mount 500. For example, rather than or in addition to the force-absorbing or shock-absorbing material being included at the bottom ends of the feet, the feet may be affixed to the mount 500 by mechanisms that absorb impact force upon the feet coming in contact with the ground. For example, the feet may be affixed to the mount 500 by a telescoping structure that dampens the impact force by reducing in length during the time of impact with the ground. In some examples, the feet may be affixed to the mount 500 such that angles formed between a bottom surface of the mount 500 and the respective feet are reduced during the time of impact with the ground, thereby absorbing the impact force. In some implementations, the feet may be included as part of the UAV 400 itself. For example, the feet may be affixed to the UAV 400 before a test flight is commenced.

The test stand 100 may allow the UAV 400 to fly in a restricted or semi-restricted manner. In some implementations, the UAV 400 is attached to the test stand 100 in a manner such that the UAV 400 maintains a substantially level flight orientation. For example, the UAV 400 may be attached to the test stand 100 (e.g., via the one or more mounting mechanisms 130 of FIG. 1, such as via the mount 500 of FIG. 5, etc.) such that the UAV 400 is substantially prevented from adjusting its roll (e.g., rotation about the front-to-back axis), yaw (e.g., rotation about the vertical axis), and/or pitch (e.g., rotation about the side-to-side axis) during flight. For example, the test stand 100 may allow for the UAV 400 to adjust only its flight altitude during the test flight (e.g., by sliding vertically along the frame 120). Such flight restrictions may be imposed by affixing the UAV 400 to the one or more mounting mechanisms 130, and affixing the one or more mounting mechanisms 130 to the frame 120, such that no degree of freedom of movement (other than the altitude) is provided. In some implementations, the UAV 400 may be prevented from adjusting its altitude during a test flight as well. Such a flight restriction may be imposed by locking the one or more mounting mechanisms 130 (e.g., by applying a stopping mechanism above and below the mounting mechanism 130 on the frame 120).

In some implementations, the test stand 100 may allow the UAV 400 to adjust any combination of one or more of its roll, yaw, and pitch during a test flight. For example, the UAV 400 may be attached to the one or more mounting mechanisms 130 in a manner that allows the UAV 400 to adjust any combination of its roll, yaw, and pitch. In some examples, the mounting mechanisms 130 (e.g., the sliding mechanisms described with respect to FIG. 1) may be configured such that the fasteners 206 that connect the wheel 202 to the UAV 400 allow for some degree of freedom of roll, yaw, or pitch for the UAV 400. For example, the mounting mechanisms 130 may include ball-and-socket joints that allow for such movements. In some implementations, the UAV 400 may be affixed to the frame 120 at a limited number of points. For example, the UAV 400 may be affixed to only one of the side portions 122 or 124 to allow the UAV 400 to freely adjust its pitch. In some implementations, the UAV 400 may be affixed such that the degree of freedom for the UAV to adjust its roll, yaw, pitch, or altitude is configurable (e.g., by manually adjusting the one or more mounting mechanisms 130).

In some implementations, the one or more mounting mechanisms 130 may be attached to the frame 120 in a manner that provides the flight freedom described herein. For example, the UAV 400 may be attached to the one or more mounting mechanisms 130 (e.g., the mount 500 of FIG. 5) in a substantially fixed manner, and the mount 500 may be attached to the frame 120 in a manner that allows the mount 500 (and thereby the UAV 400) to adjust one or more of its roll, yaw, and pitch. In some implementations, the apertures 502 of the mount 500 are designed to provide for some degree of flight freedom for any combination of roll, yaw, and pitch. For example, the apertures 502 may have a perimeter that is substantially greater than the perimeter of the beams 126 of the frame 120, thereby allowing the UAV 400 to adjust its roll, yaw, and pitch. In some implementations, the dimensions of the apertures 502 may be configurable such that the degree of flight freedom can be adjusted based on the particular flight scenario.

In some implementations, the one or more mounting mechanisms 130 may include flexible components that allow the UAV 400 to move in a semi-restricted manner. For example, the mounting mechanisms 130 may include string, chain, rope, etc. that allow the UAV 400 to adjust any combination of its altitude, roll, yaw, and pitch. In some implementations, the lengths of the flexible components may correspond to the degree of flight freedom to be afforded to the UAV 400. For example, relatively longer components (e.g., in the order of feet) may afford the UAV 400 with a relatively greater degree of flight freedom than relatively shorter components (e.g., in the order of inches). In some implementations, the lengths of the flexible components may be chosen such that there is no risk of tangling with the propellers or other components of the UAV 400.

While the test stand 100 has largely been depicted as allowing the UAV 400 to slide along the frame 120 in an up-down direction parallel to the beams 126, in some implementations, the mounting mechanisms 130, 300 and/or the mount 500 may be configured to allow the UAV 400 to slide along the beams 126 or other portions of the test stand 100 in other directions. For example, in some implementations, the test stand 100 may include beams and or tracks that run in a direction parallel to the ground, and the mounting mechanisms 130, 300 and/or the mount 500 may be affixed to the test stand 100 in a manner that permits the UAV 400 to slide along the test stand 100 in a direction parallel to the ground. The test stand 100 may allow the UAV 400 to slide in any direction that is desirable for test flight purposes (e.g., at an angle to the ground, in a curved pattern, in a predefined pattern, etc.).

In some implementations, the test stand 100 may include one or more sensors to assist with testing. For example, one or more accelerometers, gyroscopes, force sensors, vibration sensors, heat sensors, etc. may be included or embedded in the test stand 100 (e.g., the base 110, the frame 120, the mounting mechanisms 130, etc.). Such sensors may be configured to collect data during a test flight of the UAV (e.g., the UAV 400 of FIG. 4). For example, the one or more sensors may be configured to collect data that can be analyzed during and after completion of the test flight. The data may indicate the flight performance of the UAV 400 during the test flight.

In some implementations, the one or more sensors are configured to identify a direction in which the UAV 400 is predisposed to travel. For example, the UAV 400 may receive a command to maintain straight and level flight. However, due to variances in one or more components of the UAV 400 or variances in assembly, the UAV 400 may have a tendency to pull in a particular direction. The one or more sensors (e.g., such as an accelerometer or a force sensor) may be configured to detect the direction and degree of pull of the UAV 400. Such data may subsequently be used, for example, to calibrate the UAV 400.

In some implementations, a vibration sensor may be employed to ensure that the UAV 400 does not generate an unacceptable degree of vibration during flight. For example, due to variances in one or more components of the UAV 400 or variances in assembly of such components, the UAV 400 may experience vibration that can negatively impact flight accuracy, flight length, flight efficiency, etc. In some implementations, the vibration sensor may be configured to generate a signal that corresponds to a degree of vibration experienced. If the degree of vibration satisfies a threshold (e.g., a predetermined threshold), the vibration sensor may be configured to indicate such an occurrence. During or after the flight test, a technician may be notified that an unacceptable degree of vibration was experienced by the UAV 400 and the technician can address the problem that caused such vibration readings.

In some implementations, the test stand 100 may include one or more heat sensors or thermal sensors (e.g., infrared (IR) sensors) for measuring a degree of heat generated by the UAV 400. For example, one or more IR sensors may be arranged in the test stand 100 such that the IR sensors can identify the temperature of the UAV 400 at various different areas or components. In this way, components that generate an unacceptable degree of heat can be identified and corrected. For example, an IR sensor may be used to monitor the temperature of components of the UAV 400 that tend to generate the most heat, such as the engine. One or more IR sensors may be used to monitor each rotor and propeller of the UAV 400 to determine whether excessive heat is being generated (e.g., due to friction as a result of defects or improperly assembled components).

In some implementations, the test stand 100 may be configured to record all data obtained by the one or more sensors during a test flight. Such data can be analyzed during or after the test flight such that an operator or technician can quickly determine various parameters of the test flight. For example, the operator or technician can easily identify any components of the UAV 400 which may be improperly assembled or defective. The operator or technician can also determine the flight time capacity of the particular UAV 400, flight characteristics of the particular UAV 400 (e.g., whether the UAV 400 tends to pull in a certain direction and to what degree), the heat generated by the UAV 400, etc.). Such data can be compared to flight data of other UAVs 400 to determine which of the UAVs 400 are suitable for outdoor flight.

In some implementations, the test stand 100 includes a display device, such as a video screen (e.g., an LCD screen) that is configured to display information during and after a test flight. For example, the screen may display data that is collected by the one or more sensors described herein in real time. In some implementations, the screen may display a visual representation of the UAV 400 during the test flight. The screen may be configured to present indications if and when an issue is identified during the test flight. For example, if readings from the one or more sensors indicate that a component of the UAV 400 is defective (e.g., if one of the rotors is defective), the screen may display an alert indicating such. In some implementations, the visual representation of the UAV 400 may become a particular color (e.g., green, yellow, red, etc.) based on the status of the various components. For example, if a rotor is determined to be defective based on data collected from the sensor, the rotor may be displayed in red color. If the rotor is determined to be slightly defective but still suitable for flight, the rotor may be displayed in yellow color. If all components of the UAV 400 are fully operational, the UAV 400 may be displayed in green color.

In some implementations, the screen may be configured to display information related to a different test flight (e.g., a previous test flight) while a current test flight is being performed. In this way, readings from the one or more sensors that are collected during the current test flight can be compared to previous readings such that the flight characteristics of different UAVs 400 can be compared (e.g., in real time). In some implementations, the screen may include multiple display areas. Each display area may be configured to present data related to a different test flight (e.g., multiple different concurrent test flights, multiple past and/or present test flights, etc.).

In some implementations, the test stand 100 may be configured to connect to a network (e.g., the Internet) such that the data can be shared with other test stands or computing devices connected to the network. For example, a network of test stands 100 may be connected such that all test stands can share (e.g., concurrently share) flight test data in real time. In some implementations, a database is also connected to the network. The database may be configured to store previous test flight data (e.g., test flight data from all test stands 100 included in the network). In this way, flight data trends can be analyzed and identified and useful information may be obtained by statistical analysis.

The test stand 100 may include one or more identification or tracking devices for identifying a particular UAV 400 that is being tested. For example, the test stand 100 (e.g., the base 110, the frame 120, the mounting mechanisms 130, etc. of the test stand 100) may include a scanning or reading device that is configured to scan an identifying mark of a UAV 400 mounted in the test stand 100. In some implementations, the test stand 100 includes a barcode reader that is configured to read a bar code printed on a mounted UAV 400. In this way, data collected by the one or more sensors during the test flight can be correlated with the particular UAV 400. In some implementations, the test stand 100 includes a component (e.g., an RFID reader) that is configured to communicate via a short-range wireless protocol, such as RFID, NFC, Bluetooth, etc. Each UAV 400 may include a component (e.g., an RFID tag) which includes identification information (e.g., such as an ID number) that is configured to interact with the RFID reader of the test stand 100. When a UAV 400 is placed in the test stand 100 for a test flight, the RFID reader can identify RFID tag of the UAV 400 in order to determine the identification information of the particular UAV 400. In this way, collected data (e.g., data collected by all test stands 100 of a network of test stands 100) can be appropriately organized for further analysis and comparison.

In some implementations, the test stand 100 may also include a timing component (e.g., a counter or a clock) that is configured to determine a length of time during which the RFID reader and the RFID tag were within communication range of each other. Such information can be used to determine a length of time of the test flight. In some implementations, the RFID reader is positioned at a vertical position of the test stand 100 such that the RFID tag of the UAV 400 must be in flight (e.g., hovering) in order for the RFID reader and the RFID tag to be in wireless communication range. Using such a configuration, one can identify a length of a test flight by starting the timer when the RFID reader and the RFID tag are within wireless communication range of each other (e.g., when the UAV 400 begins hovering) and stopping the time when the RFID reader and the RFID tag are no longer within wireless communication range of each other (e.g., when the UAV 400 is no longer hovering due to the power source becoming depleted). Such timing information can be used to identify a flight time capacity of the power source (e.g., the engine and/or the battery).

In some implementations, the test stand 100 may be configured to attach to other test stands to form a test stand system for testing a plurality of UAVs. For example, a first test stand may include an attachment mechanism for connecting to a second test stand. The second test stand may include a receiving mechanism for accepting the attachment mechanism from the first test stand, as well as an attachment mechanism for connecting to a third test stand. The third test stand may include a receiving mechanism for accepting the attachment mechanism from the second test stand, and so on. Any number of test stands may be connected (e.g., in series) in this manner.

Figure 6:
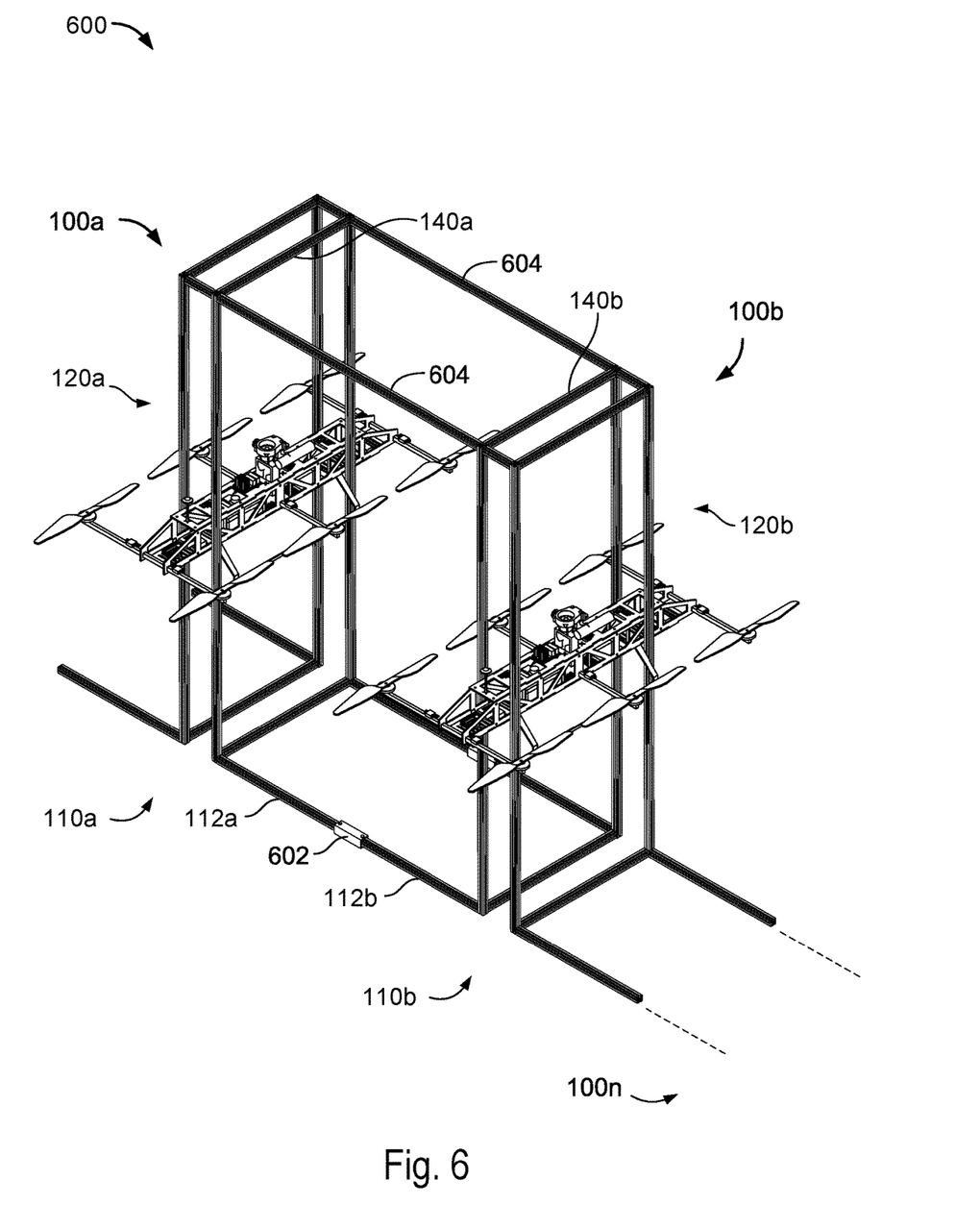
FIG. 6 shows an example of a test stand system for use with a plurality of UAVs.

FIG. 6 shows an example of a test stand system 600 that includes a plurality of test stands 100*a-n*. In the illustrated arrangement, a base 110*a* of a first test stand 100*a* is connected to a base 110*b* of a second test stand 100*b*. In particular, legs 112*a* of the first base 110*a* are connected to legs 112*b* of the second base 110*b*. In this example, the legs 112*a*, 112*b* are connected to each other by a plurality of fasteners 602.

In some implementations, the legs 112*a*, 112*b* may be connected by one or more other mechanisms. In some implementations, each test stand may be configured such that each pair of legs includes a hook having one of two configurations. For example, the legs 112*a* on a front side of the first test stand 100*a* may include hooks that have a downwards hook configuration, and the legs 112*a* on a back side of the first test stand 100*a* may include hooks that have an upwards hook configuration. Similarly, the legs 112*b* on a front side of the second test stand 100*b* may include hooks that have a downwards hook configuration, and the legs 112*b* on a back side of the second test stand 100*b* may include hooks that have an upwards hook configuration. The upwards facing hooks of the first test stand 100*a* can mate with the downward facing hooks of the second test stand 100*b* to connect the test stands 100*a*, 100*b* together. In this way, multiple test stands (e.g., each having the same configuration) can be easily connected together in series without using fasteners 602.

In the illustrated arrangement, the test stands 100a, 100b are also connected to each other at the top portions of the test stands 100a, 100b. In particular, each test stand 100a, 100b includes a cross beam 140a, 140b that is affixed to top ends of the frame 120a, 120b. The cross beams 140a, 140b are connected to each other by a plurality of joists 604. In some implementations, the joists 604 are connected to the cross beams 140a, 140b by fasteners. In some implementations, the joists 604 are connected to the cross beams 140a, 140b by hooks.

Although not shown in FIG. 6, it should be understood that the second test stand 100b can be similarly connected to a third test stand 100c, which in turn can be similarly connected to a fourth test stand 100d, etc.

The test stand system 600 can provide a way to simultaneously test a plurality or UAVs under similar conditions. In some examples, one or more parameters related to the UAV, the flight test scenario, or both may be altered across the test flights of the various UAVs. For example, a plurality of UAVs that have slightly different weights, but are otherwise identical, may be simultaneously tested in the various test stands 100a-n. The test flights may be performed to determine how long the power sources of the respective UAVs can supply sufficient power to maintain flight without needing to be replenished. In this way, the test stand system 600 can provide common testing conditions for determining how a single variable (e.g., weight) affects the flight performance of the UAVs.

A number of embodiments have been described. Nevertheless, it will be understood that various modifications may be made without departing from the spirit and scope of the subject matter described herein. Other such embodiments are within the scope of the following claims.

What is claimed is:

1. A test stand for an unmanned aerial vehicle comprising:
a base arranged to make contact with the ground;
a frame extending from the base, the frame comprising at least a first side portion and a second side portion that define a space therebetween;
one or more mounting mechanism slidably attached to the frame, the one or more mounting mechanism configured to affix to an unmanned aerial vehicle such that the unmanned aerial vehicle is permitted to slide within the defined space in a direction parallel to the frame during a test flight; and
a cross beam affixed to a top end of the first side portion and a top end of the second side portion such that the defined space is below the cross beam.

2. The test stand of claim 1, wherein the base comprises a plurality of legs.

3. The test stand of claim 2, wherein the plurality of legs reside parallel to the ground.

4. The test stand of claim 2, wherein the plurality of legs form angles with the ground such that bottom ends of the plurality of legs make contact with the ground and top ends of the plurality of legs are affixed to the frame.

5. The test stand of claim 1, wherein each of the one or more mounting mechanism comprises:
a wheel that is configured to reside in a respective track formed in the frame; and
a fastener that is configured to affix the wheel to a corresponding clearance hole in the unmanned aerial vehicle.

6. The test stand of claim 1, wherein the one or more mounting mechanism comprises a mount.

7. The test stand of claim 6, wherein the mount comprises at least a first aperture within which the first side portion of the frame resides and a second aperture within which the second side portion of the frame resides.

8. The test stand of claim 6, wherein the mount comprises clips that are configured to attach to receiving mechanisms on the unmanned aerial vehicle.

9. The test stand of claim 6, wherein the mount comprises a docking device that is configured to releasably attach to the unmanned aerial vehicle.

10. The test stand of claim 6, wherein one or both of the mount and the unmanned aerial vehicle comprises one or more feet configured to dampen a collision with the ground.

11. The test stand of claim 10, wherein the feet comprise one or more springs.

12. The test stand of claim 10, wherein the feet comprise a force-absorbing material.

13. The test stand of claim 1, wherein the first side portion comprises two beams that extend from the base and the second side portion comprises two beams that extend from the base.

14. The test stand of claim 1, wherein the frame comprises one or more additional side portions that further define the space.

15. The test stand of claim 1, wherein the test stand is configured to attach to other test stands to form a test stand system for testing flights of a plurality of unmanned aerial vehicles.

16. A test stand system for a plurality of unmanned aerial vehicles comprising:
a plurality of test stands each comprising:
a base arranged to make contact with the ground;
a frame extending from the base, the frame comprising at least a first side portion and a second side portion that define a space therebetween;
one or more mounting mechanism slidably attached to the frame, the one or more mounting mechanism configured to affix to an unmanned aerial vehicle such that the unmanned aerial vehicle is permitted to slide in a direction parallel to the frame during a test flight; and
a cross beam affixed to a top end of the first side portion and a top end of the second side portion such that the defined space is below the cross beam,
wherein each base comprises one or more mechanisms for fixing the bases of the plurality of test stands together.

17. The test stand system of claim 16, further comprising a plurality of joists that each connects the cross beam of one of the test stands to the cross beam of another one of the test stands.

* * * * *